Figure 1:
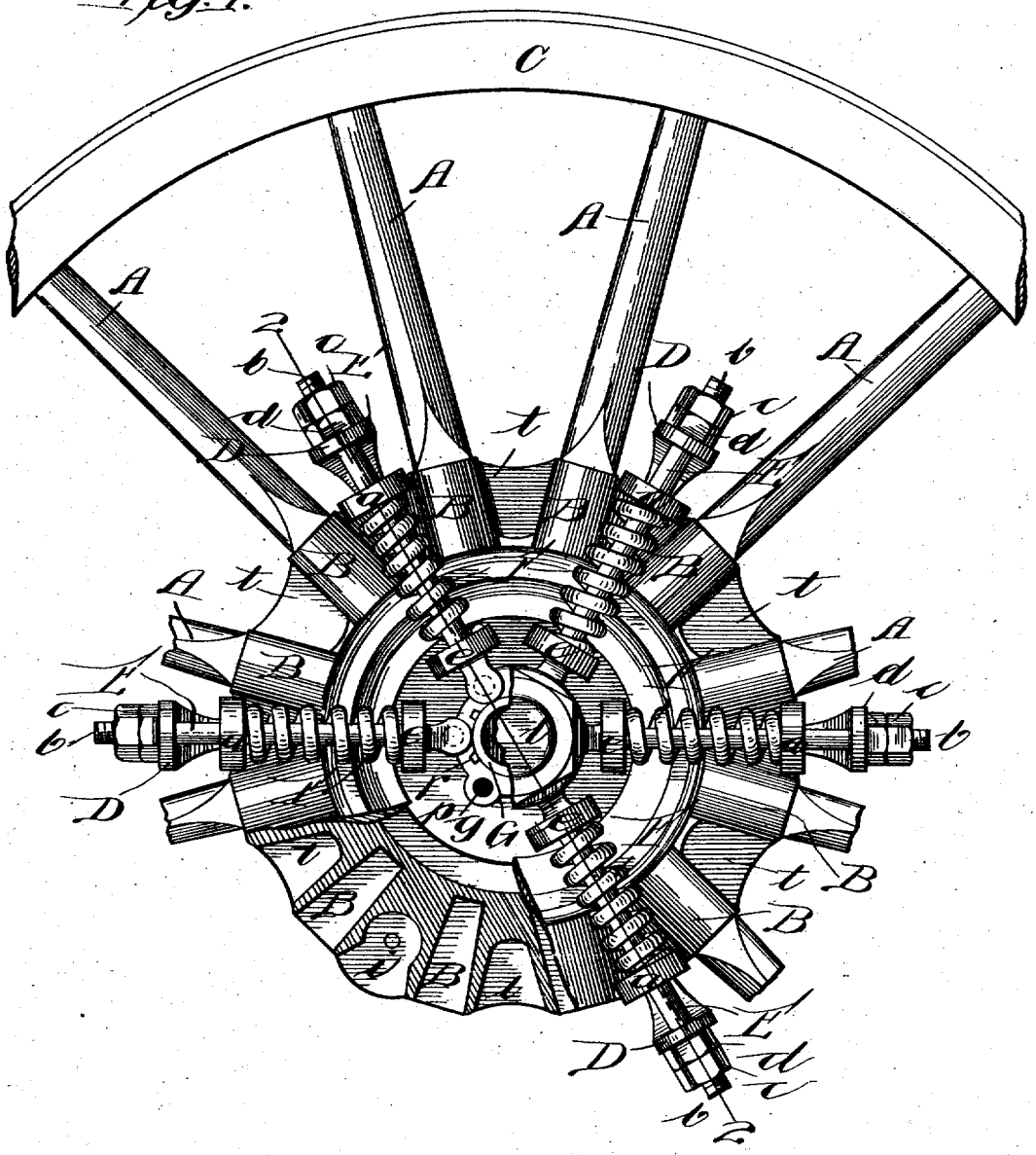

No. 12,325. REISSUED MAR. 14, 1905.

H. H. TAYLOR.

VEHICLE WHEEL.

APPLICATION FILED NOV. 28, 1904.

3 SHEETS—SHEET 1.

Witnesses:
G. V. Domans.
J B Weir

Inventor
Horace H. Taylor
by
Bond Adams, Pickard & Jackson
Attys

THE ECKERT LITHOGRAPHING CO., WASHINGTON, D. C.

No. 12,325. REISSUED MAR. 14, 1905.

H. H. TAYLOR.

VEHICLE WHEEL.

APPLICATION FILED NOV. 28, 1904.

3 SHEETS—SHEET 2.

Witnesses:
G. V. Domarus.
J. B. Weer

Inventor:
Horace H. Taylor
by
Bond Adams, Pickard & Jackson
Attys

THE ECKERT LITHOGRAPHING CO., WASHINGTON, D. C.

No. 12,325.

REISSUED MAR. 14, 1905.

H. H. TAYLOR.

VEHICLE WHEEL.

APPLICATION FILED NOV. 28, 1904.

3 SHEETS—SHEET 3.

Witnesses:-

G. U. Downing.

J. B. Weir

Inventor:

Horace H. Taylor by Bond Adams, Pickard & Harrison attys

THE ECKERT LITHOGRAPHING CO., WASHINGTON, D. C.

No. 12,325. Reissued March 14, 1905.

UNITED STATES PATENT OFFICE.

HORACE H. TAYLOR, OF SAN JOSE, CALIFORNIA, ASSIGNOR OF ONE-TENTH TO JAMES A. CURRY, OF SAN JOSE, CALIFORNIA.

VEHICLE-WHEEL.

SPECIFICATION forming part of Reissued Letters Patent No. 12,325, dated March 14, 1905.

Original No. 766,780, dated August 2, 1904. Application for reissue filed November 28, 1904. Serial No. 234,681.

*To all whom it may concern:*

Be it known that I, HORACE H. TAYLOR, a citizen of the United States, residing at San Jose, in the county of Santa Clara and State of California, have invented certain new and useful Improvements in Vehicle-Wheels; and I do hereby declare that the following is a full, clear, and exact description of the same, making a part of this specification, and to the letters of reference marked thereon.

The present invention has for its object to provide a spring-wheel especially adapted for use on all classes of cycles, automobiles, and other fast-speed machines or vehicles whereby the shocks usually communicated to the rims of this class of wheels from coming in contact with the inequalities of the roadway—such as striking or riding over a stone, rut, or other obstruction in the path of the vehicle—will be materially reduced by the peculiar construction of the wheel, thereby securing comfort and ease to the occupants of the vehicle, as the jar and shock to the frame of the vehicle are reduced to a minimum.

The invention consists in a vehicle-wheel constructed substantially as shown in the drawings and hereinafter described and claimed.

Figure 2:
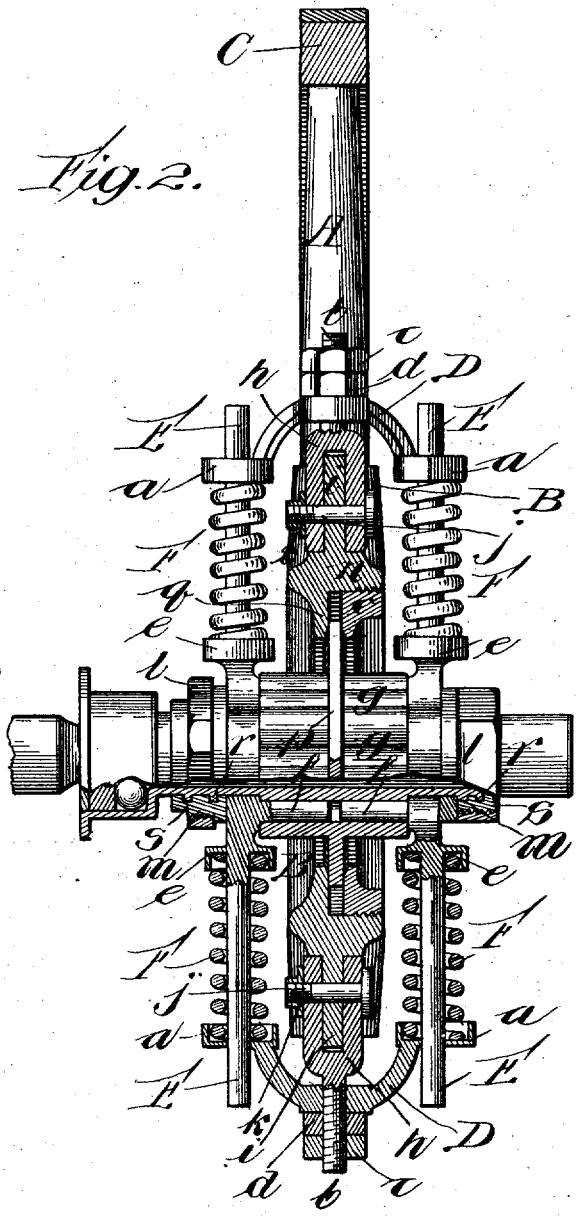
Figure 3:
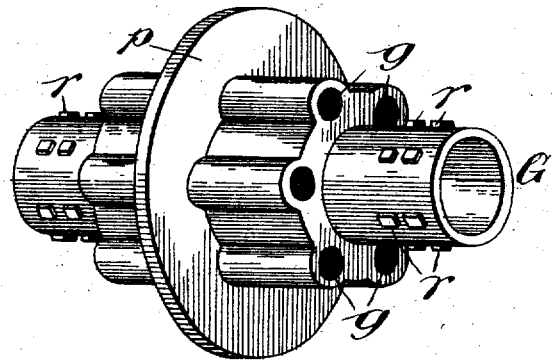
Figure 4:
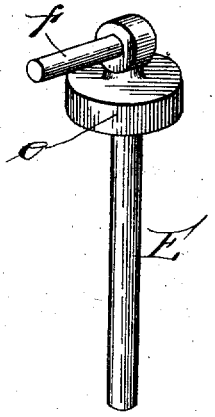
Figure 5:
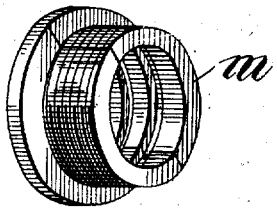

Figure 1 of the drawings is a side elevation of a portion of a vehicle-wheel embodying my invention; Fig. 2, a sectional elevation taken on line 2 2 of Fig. 1; Fig. 3, a detail perspective view of the central portion of the hub of the wheel. Fig. 4 is a similar view of one of the rods around which the spring is coiled, and Fig. 5 a perspective view of one of the split washers.

In the accompanying drawings the vehicle-hub is shown with a plurality of suitable sockets B, with which engage the inner ends of the spokes A, the opposite ends of the spokes being suitably connected to the rim C of the wheel.

Between each pair of the sprockets B or between every alternate pair of sockets, as found preferable and as shown in the drawings, is a bracket D of the desired construction, which is shown more clearly in Fig. 2 of the drawings. These brackets D, which may be of any desirable construction, support the free ends of the rods E, said rods being shown in detail in Fig. 4 of the drawings.

Each bracket D is of such construction as to extend out from each side of the vehicle-hub and terminates in cup-shaped supports *a* at its ends, as shown in Fig. 2 of the drawings.

The bracket D is held in position by a screw-rod *b*, with which the bracket engages, and the nuts *c d*, which engage the screw-threaded portion of the rod.

The rods E, which extend through holes in the cup-shaped supports *a*, have similar cup-shaped supports *e* at their inner ends, and with these supports engage the respective ends of spiral springs F to hold the springs in position around the rods.

The rods E have journals *f* at right angles thereto and are free to move in the bearings *g* in the central portion of the hub, these bearings and their connections being shown in Fig. 3 of the drawings.

The screw-rod *b* has a yoke *h* to embrace a web *i* in the outer portion of the hub, as shown in Figs. 1 and 2 of the drawings, said yoke being connected thereto by a screw-bolt *j* and nut *k*, a suitable number of these webs being used, according to the number of rods and springs required in the wheel.

The rods E and their journals *f* are held in position by nuts *l* and split washers *m* or by any other suitable and well-known means found best adapted to the purpose, and it should be understood that the journal and the bracket D are free to move on their bearings, as may be required.

The outer portion of the hub, as shown at B, is constructed of two parts, which have screw-threaded flanges *n o* to enable the two parts or sections to be coupled together, as indicated in Fig. 2 of the drawings, or any other means may be provided for separably connecting the two sections forming the outer portion of the hub together, as found desirable. In the present instance the section *o* serves as a clamping-disk to hold the central portion of the hub comprising the series of tubular bearings *g* in position at the center of the hub, the bearings having a circumferential flange *p*, which is held between the flange *q* of the hub and the screw-flange *o*, as shown. The series of tubular bearings *q*, the circumferential flange *p*, and the tubular box G are integral or cast or otherwise formed in one piece, and the box through which the axle passes has a plurality of flat-sided projections *r*, and the split washers *m* have correspondingly-formed recesses *s* to engage therewith, as shown in Fig. 2 of the drawings.

The tension on the springs F is accomplished through the pressure of the cup-shaped supports *a* of the bracket D and the nuts *c d* raising or lowering the bracket upon the screw-rod *b* through the medium of the nuts, thereby regulating the tension of the spring as circumstances require.

By the employment of the circumferential flange *p* in connection with the flanges *o q* any side motion of the vehicle can do no injury to the rods E and will remove the danger of the spokes, rim, and tire of the wheel flying off.

The manner of supporting the rods E and the free ends extending through the cup-shaped supports *a* permit the play of the rods in or out and at angles to the radial line to the center of the hub.

Each spring on both sides of the wheel above and below the vertical line bears its portion of the load, being acted upon when the rim of the wheel comes in contact with any resistance, thereby taking the place of the usual rubber tire, the peculiar construction of the wheel, as herein described, enabling it to possess the resilient qualities of a wheel with rubber tires. For convenience I shall term that portion of the hub comprising the sockets for the spokes and the parts connecting therewith the "outer" hub and the series of tubular bearings *q*, the circumferential flange *p*, and the box G the "inner" hub, and, if desired, the outer hub may have a series of webs *t* between the sockets for the spokes in order that the hub may be strengthened.

In describing the construction of the various parts of the wheel I do not wish to be understood as limiting my invention thereto in every detail, as many changes may be resorted to and modification made in the invention without in any manner departing from the principle of the invention, and any suitable spring may be used in place of that shown as may be found desirable, the entire construction of the wheel being subject to many changes without affecting the essential features of the invention.

Having now fully described my invention, what I claim as new, and desire to secure by Letters Patent, is—

1. A vehicle-wheel comprising an outer rim, an outer hub having suitable sockets, spokes fitting therein and connected to the rim, a central hub having a plurality of tubular bearings, rods having journals extending at right angles thereto and engaging the tubular bearings, suitable springs upon the rods, and means for holding the springs thereon, substantially as and for the purpose set forth.

2. In a vehicle-wheel, a central hub having a plurality of tubular bearings, rods having journals extending at right angles thereto and engaging the tubular bearings and having cup-shaped supports, and adjustable brackets having cup-shaped supports, the ends of the springs resting therein and in the support of the rods, said rods extending through holes in the cup-shaped supports of the brackets, substantially as and for the purpose described.

3. In a vehicle-wheel, an outer hub to which the spokes are connected and an inner hub having a plurality of tubular bearings, a circumferential flange around the outer side of the bearings, and a suitable box, rods having journals at right angles thereto engaging the tubular bearings, suitable springs upon the rods, and means for regulating the tension of the springs, substantially as and for the purpose specified.

4. In a vehicle-wheel, a central hub having a plurality of tubular bearings and a circumferential flange around the same, an outer hub to which the spokes are connected having a central clamping-flange and a screw-threaded clamping-flange separable from the hub between which flanges the flange of the central or inner hub is held, rods with springs thereon, journals extending at right angles to the rod and engaging the tubular bearings, substantially as and for the purpose set forth.

5. In a vehicle-wheel, a central hub comprising a plurality of tubular bearings and having a tubular box, a circumferential flange around the bearings, an outer hub to which the spokes of the wheel are connected, said hub being formed in two separable sections between which the circumferential flange is held, rods with suitable springs thereon, said rods having journals at right angles thereto and engaging the tubular bearings, and means for regulating the tension of the springs, substantially as and for the purpose described.

6. A vehicle-wheel, comprising a suitable rim and an outer hub and spokes connecting the rim with the hub, an inner or central hub comprising a plurality of tubular bearings and a circumferential flange, a stationary and separable flange around the center of the outer hub between which the flange of the inner hub is clamped and held, rods having suitable springs thereon and having journals at right angles thereto and engaging the tubular bearings, cup-shaped supports upon the rods with which the ends of the springs engage, and means for regulating the tension of the springs, consisting of adjustable brackets having cup-shaped supports for the ends of the springs, the rods extending through the holes in the brackets, substantially as and for the purpose specified.

7. In a vehicle-wheel, the combination with an outer hub and an inner hub, of brackets carried by one of said hubs and extending transversely of the plane of the wheel-rim upon each side thereof, springs between the ends of said brackets and the other hub, and means for preventing the lateral movement of one hub with reference to the other, substantially as described.

8. In a vehicle-wheel, the combination with an outer hub and an inner hub, of brackets carried by one of said hubs and extending transversely of the plane of the wheel-rim upon each side thereof, springs between the ends of said brackets and the other hub, means for adjusting the tension of said springs, and means for preventing the lateral movement of one hub with reference to the other, substantially as described.

9. In a vehicle-wheel, the combination with an outer hub and an inner hub, of radially-adjustable brackets carried by one of said hubs and extending transversely of the plane of the wheel-rim upon each side thereof, springs between the ends of said brackets and the other hub, and means for preventing the lateral movement of one hub with reference to the other, substantially as described.

10. In a vehicle-wheel, the combination of an outer hub, an inner hub, a circumferential flange on one of said hubs, and a groove in the other of said hubs adapted to receive said flange and prevent the movement of one of said hubs laterally of the plane of the wheel with reference to the other, of brackets mounted on said outer hub and adjustable thereon radially of said hub and extending transversely of the plane of the wheel-rim and upon each side thereof, bearings on the ends of said brackets, opposing bearings on said inner hub, and springs between the bearings on the ends of said brackets and the bearings on said inner hub, substantially as described.

In testimony whereof I affix my signature in presence of two witnesses.

HORACE H. TAYLOR.

Witnesses:
GRACE D. CAMPBELL,
O. G. WILKINS.